United States Patent [19]

Beesley

[11] Patent Number: 4,554,665

[45] Date of Patent: Nov. 19, 1985

[54] RADIO RECEIVER INCORPORATING A DATA OPERATED SQUELCH SYSTEM

[75] Inventor: Graham E. Beesley, Basingstoke, England

[73] Assignee: Motorola, Inc., Schaumburg, Ill.

[21] Appl. No.: 465,867

[22] PCT Filed: May 28, 1982

[86] PCT No.: PCT/GB82/00159
§ 371 Date: Feb. 7, 1983
§ 102(e) Date: Feb. 7, 1983

[87] PCT Pub. No.: WO82/04513
PCT Pub. Date: Dec. 23, 1982

[30] Foreign Application Priority Data

Jun. 16, 1981 [GB] United Kingdom ............. 8118533

[51] Int. Cl.⁴ .............................................. G06F 11/10
[52] U.S. Cl. .................................... 371/55; 375/81; 375/90; 375/102
[58] Field of Search ............ 371/55, 57, 49; 375/76, 375/104, 90, 102, 81; 455/212, 218

[56] References Cited

U.S. PATENT DOCUMENTS

| 3,671,935 | 6/1972 | Lipp et al. ............... | 371/55 |
| 3,995,264 | 11/1976 | Ouchi .................. | 371/55 |
| 4,223,326 | 9/1980 | D'Amato et al. ........ | 371/57 |
| 4,229,822 | 10/1980 | Bench .................. | 375/81 |
| 4,264,972 | 4/1981 | Drullmann et al. ...... | 371/55 |
| 4,276,649 | 6/1981 | Groenendeal et al. .... | 371/55 |

FOREIGN PATENT DOCUMENTS 1057156 2/1967 United Kingdom .

Primary Examiner—Michael R. Fleming
Attorney, Agent, or Firm—John S. Paniaguas; Donald B. Southard; Maurice J. Jones, Jr.

[57] ABSTRACT

A data processing system of the kind in which there is a transmission of a code format having a pattern that provides a plurality of reversals 10101100 etc. from which it is desirable to be able to differentiate between valid data and invalid data. Invalid data means the absence of data, data corrupted by noise or data alien to the system. The system is characterized by means arranged to provide the times between n zero crossings as given by the expression:

$$R = \frac{1}{n} \sum_{i=1}^{n} \left[ t_i - I\left(t_i \frac{z}{x} - 0.5\right) \right]$$

where I is the integer part of x, n is an integer representing the number of zero crossings and $t_i$ is the duration of the ith interval between zero crossings measured on a bit base of unity thereby to permit the use of said number (R) when compared with a predetermined tolerance range to provide an indication of the quality of said transmission.

7 Claims, 3 Drawing Figures

RADIO RECEIVER INCORPORATING A DATA OPERATED SQUELCH SYSTEM

FIELD OF INVENTION

The present invention relates to a data processing system of the kind (hereinafter referred to as the kind set forth) in which there is a transmission of a code format having a pattern that provides a plurality of reversals 10101100 etc. from which it is desirable to be able to differentiate between valid data and invalid data. Invalid data means the absence of data, data corrupted by noise or data alien to the system.

SUMMARY OF THE INVENTION

According to the present invention there is provided a data processing system of the kind set forth wherein means are arranged to provide the times between n zero crossings as herein defined to measure said times to establish the number (R) between said zero crossings as given by the expression:

$$R = \frac{1}{n} \sum_{i=1}^{n} \left[ t_i - I(t_i \frac{z}{x} 0.5) \right]$$

where I is the integer part of x, n is an integer representing the number of zero crossings and $t_i$ is the duration of the ith interval between zero crossings measured on a bit base of unity thereby to permit the use of said number (R) when compared with a predetermined tolerance range to provide an indication of the quality of said transmission.

In one construction n is between 8 and 100 and in a convenient construction n is 32 or 64.

By the term zero crossing is to be understood the time at which zero volts is crossed when going from a positive voltage to a negative voltage or vice versa.

BRIEF DESCRIPTION OF THE DRAWINGS

The invention will be more fully understood from the following description given by way of example only with reference to the figures of the accompanying drawings and the following Example in which.

DESCRIPTION OF THE PREFERRED EMBODIMENT

Consider as one Example a transmission in which the code format has sixty four zero crossings as shown in the table below and the values for $z = t_i - I(t_i - 0.5)$ are:

TABLE

| Z | Z | Z | Z | Z | Z | Z | Z |
|---|---|---|---|---|---|---|---|
| 3.2 | 1.2 | 9.1 | 1.1 | 1.7 | 0.7 | 2.8 | 0.8 |
| 1.6 | 0.6 | 9.2 | 1.2 | 1.7 | 0.7 | 2.7 | 0.7 |
| 1.2 | 1.2 | 5.8 | 0.8 | 1.8 | 0.8 | 2.7 | 0.7 |
| 1.3 | 1.3 | 6.3 | 1.3 | 1.9 | 0.9 | 2.7 | 0.7 |
| 2.4 | 1.4 | 4.7 | 0.7 | 1.8 | 0.8 | 2.7 | 0.7 |
| 6.1 | 1.1 | 4.3 | 1.3 | 1.8 | 0.8 | 6.8 | 0.8 |
| 7.8 | 0.8 | 4.2 | 1.2 | 1.6 | 0.6 | 6.8 | 0.8 |
| 6.2 | 1.2 | 4.2 | 1.2 | 1.6 | 0.6 | 3.1 | 1.1 |
| 5.3 | 1.3 | 4.2 | 1.2 | 1.5 | 0.5 | 2.1 | 1.1 |
| 1.7 | 0.7 | 7.1 | 1.1 | 2.3 | 1.3 | 1.7 | 0.7 |
| 1.6 | 0.6 | 7.6 | 0.6 | 2.7 | 0.7 | 1.6 | 0.6 |
| 1.5 | 0.5 | 7.6 | 0.6 | 6.4 | 1.4 | 1.5 | 0.5 |
| 1.2 | 1.2 | 7.1 | 1.1 | 5.8 | 0.8 | 1.4 | 1.4 |
| 1.2 | 1.2 | 7.1 | 1.1 | 3.7 | 0.7 | 7.3 | 1.3 |
| 1.2 | 1.2 | 6.2 | 1.2 | 3.6 | 0.6 | 6.2 | 1.2 |
| 1.4 | 1.4 | 3.1 | 1.2 | 3.7 | 0.7 | 2.3 | 1.3 |

Then taking the first three examples in the table (1) is:

$$3.2 - I(3.2 - 0.5)$$
$$3.2 - I(2.7)$$
$$3.2 - 2$$
$$\underline{1.2}$$

and (2) is:

$$1.6 - I(1.6 - 0.5)$$
$$1.6 - I(1.1)$$
$$1.6 - 1$$
$$\underline{0.6}$$

and (3) is:

$$1.2 - I(1.2 - 0.5)$$
$$1.2 - I(0.7)$$
$$1.2 - 0$$
$$\underline{1.2}$$

Clearly the sixty four values in the table for Z summated is 60.9 thus:

$$R \text{ is } \frac{1}{64}(60.9)$$

$$R \text{ is } \frac{60.9}{64} = 0.9515$$

The value R with a tolerance can, therefore, be used to make a decision for a satisfactory squelch that is to say a system which switches at least a part of a receiver between a quiescent and an active state depending upon the quality of the signal received.

The tolerance having been chosen to be for example 0.8 to 1.1 then R at 0.9515 is seen to fall within that tolerance and thereby indicate a signal of a predetermined quality.

The squelch may be used to obtain good sensitivity in a radio pager for example without wasting battery life.

Figure 1:
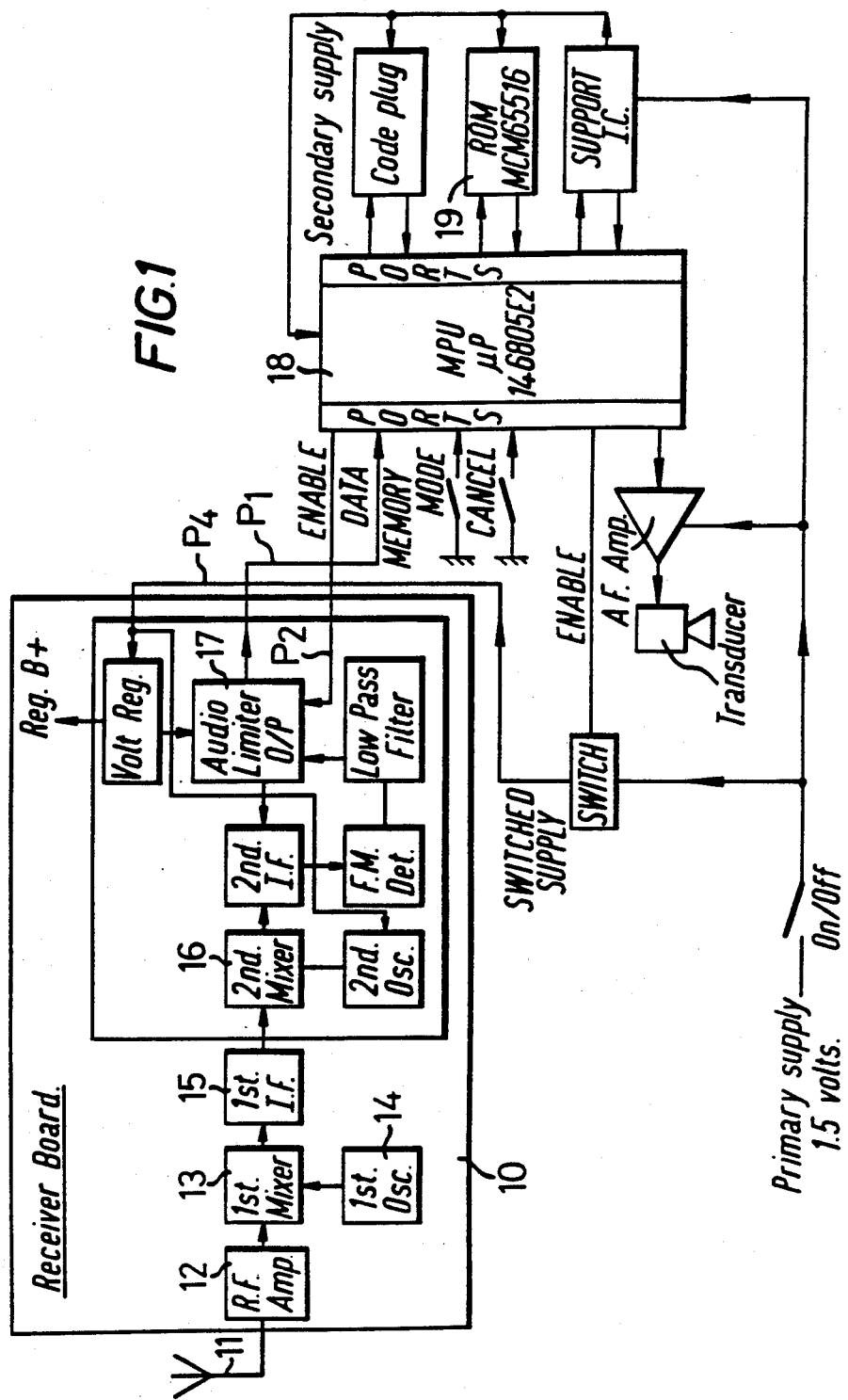
FIG. 1 is a circuit block diagram of a pager incorporating data operated squelch of the invention and FIG. 2 is a flow diagram of the operations performed by the present invention.
Figure 2:
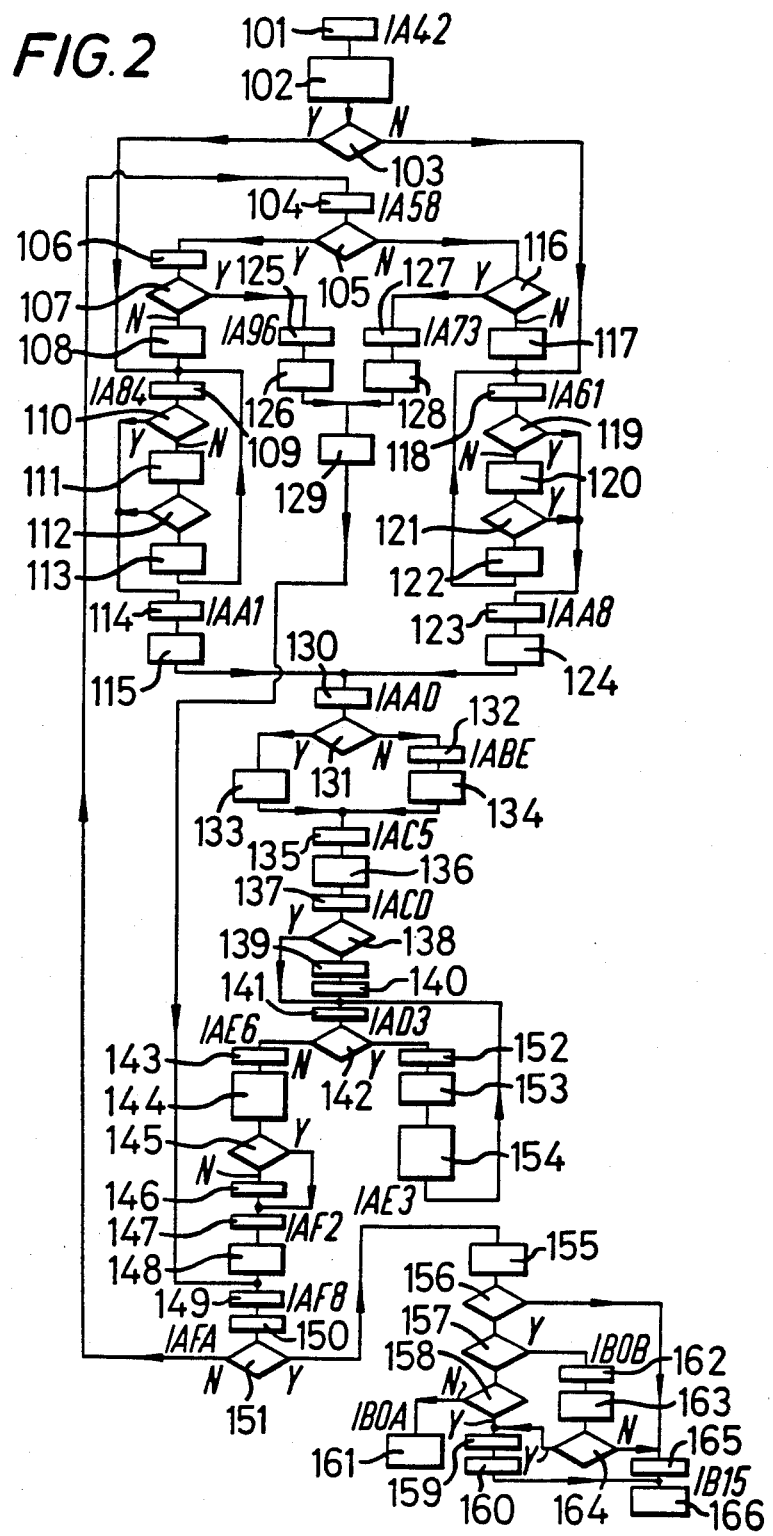
Figure 3:
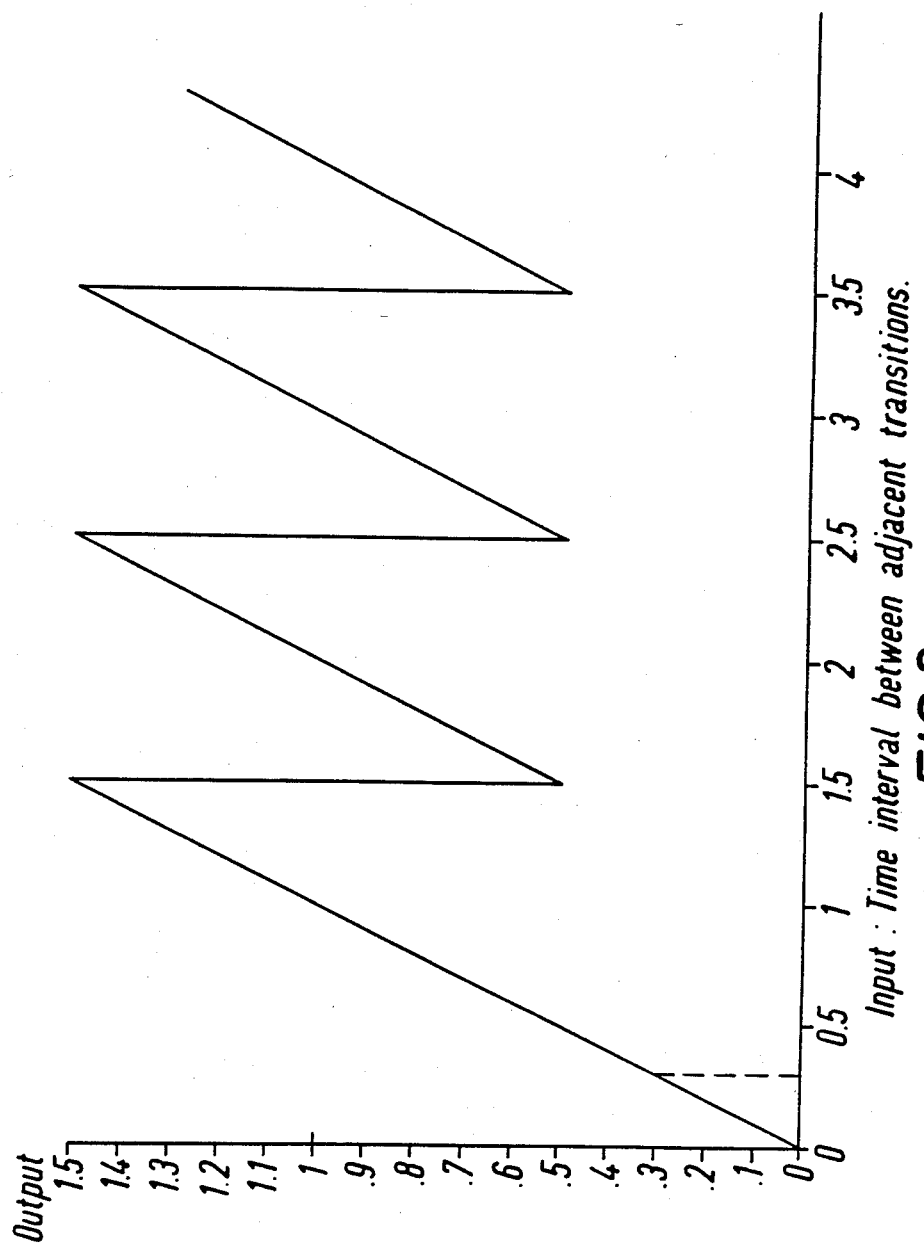
FIG. 3 is a graphical presentation of the transfer function of the expression used in the invention to illustrate a refinement of the circuitry.

Referring now to FIG. 1 the circuitry operates in such a way as to produce a specific transfer function of the form shown graphically in FIG. 3. The input is the time interval ($t_i$) between adjacent transitions of the input signal. The output is numerical and is averaged over the required number (n) of transition interval samples to form the resultant (R). The decision of the squelch circuit is made by comparing this resultant (R) against some preset limits so that within this range the squelch may indicate a valid signal to the rest of the circuitry. One specific embodiment utilizing a microprocessor based system is illustrated in FIG. 1 and the flow chart for this specific embodiment is given in FIG. 2. A listing is given in the attached appendix A of the logic to be applied to the ROM memory to be interpreted by the microprocessor unit MPU. In FIG. 1 a radio pager comprises a receiver board 10 having an aerial 11 by which a signal enters a radio frequency amplifier 12 a 1st mixer 13 coupled to a 1st oscillator 14 to a 1st intermediate frequency amplifier 15; from which it passes inter alia via a 2nd mixer 16 to an audio limiter 17 connected to the input/output of the microprocessor 18 (MC14605E2) which is related to the memory of ROM (MCM65516) 19.

The MPU will receive from the ROM a logical sequence set out in the flow sheet of FIG. 2 wherein:

101 is BTSYNC
102 is initialization clear flags load count
103 is zero port A clear?
104 is BSBEG
105 is 7 BFLAG set
106 is BSNT 1
107 is zero port A set?
108 is increment BTPRD
109 is BSNT1 0
110 is zero port A set?
111 is DMT (dead man timer) reset, increment BTPRD
112 is zero port A set
113 is DMT reset, increment BTPRD
114 is BSTIM 1
115 is LDA timer BCLR 7, BFLAG
116 is zero port A clear?
117 is increment BTPRD
119 is BSNT 0 1
119 is zero port A clear?
120 is DMT (dead man timer) reset, increment BTPRD
121 is zero port A clear?
122 is DMT reset, increment BTPRD
123 is BSTIM0
124 is LDA timer B set 7, BFLAG
125 is BSNT0
126 is BCLR 7, BFLAG
127 is BSNSE 1
128 is BSET 7 BFLAG
129 is LDA 0 1/STA/BTPRD/CLR/TEMPB
130 is BSTIME
131 is timer greater than 7A
132 is BSUB
133 is subtract 1.0 from timer
134 is add 0 to timer
135 is BSPRDX
136 is LDA/BTPRD STA/TEMPA/CLR/BTPRD
137 is subtract 06
138 is A greater than zero?
139 is COMA
140 is INCA
141 is BSPRD0
142 is A greater than 0.C.?
143 is BSPRD2
144 is LDA/TEMPA/SUB/TEMP B add BTTOT STA/BTTOT
145 is C.CLEAR
146 is INC.CARRY
147 is BSPRD4
148 is LDA05 STA/BTPRD
149 is BSPRD3
150 is DEC/BTCNT
151 is BTCNT equals zero?
152 is SUBOC
153 is CLRX/TAX
154 is add 0.C to TEMPB INC/BTPRD. TXA JMP/B5 PRD0
155 is LDA carry STA/TEMPA
156 is carry less than 2?
157 is carry equals 2?
158 is carry equals 3?
159 is BSPRD8
160 is BSETOBFLAG
161 is RTS global
162 is BSPRD7
163 is LDA/BTTOT/STA/TEMPB
164 is TEMPB greater than MXLVL
165 is BSPRD6
166 is RTS global In FIG. 3 there is shown a graphical representation of the transfer function of the expression:

$$R = \frac{1}{n} \sum_{i=1}^{n} [t_i - I(t_i - 0.5)]$$

Clearly if for example the first three figures of the table above 3.2; 1.6 and 1.2 are entered on the abscissa than the values for Z respectively (1.2; 0.6; 1.2) are read off along the ordinate. But as is well known a system of sequential logic requires a finite time to 'think' and even where the bit width uses but 1.953 milliseconds, as shown close to the origin three tenths of this time may pass before the enabling means of the transfer function is entered. One solution is self evident viz to enter after a short time interval of 1.953×0.3 milliseconds and advance on the transfer function at that point, or to use parallel logic circuitry or a faster clock rate or overcome the difficulty from an analog circuit.

APPENDIX

```
1A42 40 A6        BT SYNC   LDA   #$40
1A44 B7 1E        A         STA   BTCNT
1A46 B7 4B        A         STA   BTTOT
1A48 3F 4A        A         CLR   BTPRD
1A4A 3F 4C        A         CLR   CARRY
1A4C 3F 2B        A         CLR   BFLAG
1A4E A6 08        A         LDA   #$08
1A50 B7 01        A         STA   PORTB
1A52 01 00 2F 1A84          BRCLR 0, PORTA, BSNT1 0
```

```
1A55 CC 1A61        A             JMP    BSNT01
1A58 0E 28 23 1A7E  BSBEG  BRSET   7,BFLAG,BSNT1
1A5B 01 00 15 1A73         BRCLR   0,PORTA,BSNSE1
1A5E 3C 4A          A             INC    BTPRD
1A60 9D                           NOP
1A61 01 00 44 1AA8  BSNT01 BRCLR  0,PORTA,BSTIM0
1A64 1E 01          A             BSET   7,PORTB
1A66 3C 4A          A             INC    BTPRD
1A68 9D                           NOP
1A69 00 00 3C 1AA8         BRCLR  0,PORTA,BSTIM0
1A6C 1F 01          A             BCLR   7,PORTB
1A6E 3C 4A          A             INC    BTPRD
1A70 CC 1A61        A             JMP    BSNT01
1A73 1E 28          A BSNSE1 BSET. 7,BFLAG
1A75 A6 01          A             LDA    #$01
1A77 B7 4A          A             STA    BTPRD
1A79 3F 4E          A             CLR    TEMPB
1A7B CC 1AF8        A             JMP    BSPRD3
1A7E 00 00 15 1A96  BSNT1  BRSET  0,PORTA,BSNT0
1A81 3C 4A          A             INC    BTPRD
1A83 9D                           NOP
1A84 00 00 1A 1AA1  BSNT10 BRSET  0,PORTA,BSTIM1
1A87 1E 01          A             BSET   7,PORTB
1A89 3C 4A          A             INC    BTPRD
1A8B 9D                           NOP
1A8C 00 00 12 1AA1         BRSET  0,PORTA,BSTIM1
1A8F 1F 01          A             BCLR   7,PORTB
1A91 3C 4A          A             INC    BTPRD
1A93 CC 1A84        A             JMP    BSNT10
1A96 1F 28          A BSNT0  BCLR  7,BFLAG
1A98 A6 01          A             LDA    #$01
1A9A B7 4A          A             STA    BTPRD
1A9C 3F 4E          A             CLR    TEMPB
1A9E CC 1AF8        A             JMP    BSPRD3
1AA1 B6 08          A BSTIM1 LDA  TIMER
1AA3 1F 28          A             BCLR   7,BFLAG

1AA5 CC 1AAD        A             JMP    BSTIME
1AA8 B6 08          A BSTIM0 LDA  TIMER
1AAA 1E 28          A             BSET   7,BFLAG
1AAC 9D                           NOP
1AAD AE 06          A BSTIME LDX  #$06
1AAF BF 01          A             STX    PORTB
1AB1 A1 7A          A             CMP    #$7A
1AB3 2A 09        1ABE            BHS    BSSUB
1AB5 B6 08          A             LDA    TIMER
1AB7 AB 08          A             ADD    #$08
1AB9 B7 08          A             STA    TIMER
1ABB CC 1AC5        A             JMP    BSPRDX
1ABE B6 08          A BSSUB  LDA   TIMER
1AC0 A0 10          A             SUB    #$10
1AC2 B7 08          A             STA    TIMER
1AC4 9D                           NOP
1AC5 B6 4A          A BSPRDX LDA   BTPRD
1AC7 B7 4D          A             STA    TEMPA
1AC9 3F 4A          A             CLR    BTPRD
1ACB 3F 4E          A             CLR    TEMPB
1ACD A0 06          A             SUB    #$06
1ACF 24 02        1AD3            BHS    BSPRD0
1AD1 43                           COMA
```

I claim:

1. A radio receiver comprising in combination:
   receiving means for receiving a digitally coded radio signal in which the code format has a pattern that provides a plurality of zero crossings;
   decoding means for decoding a received signal fed from the receiving means and producing a signal representative of the difference between the duration of a preselected interval between zero crossings expressed as a ratio to a predetermined bit period, and a predetermined integer value of the said ratio;
   means for switching at least part of the receiver between a quiescent and an active state in dependence upon the value of the integrated signal.

2. A radio receiver as claimed in claim 1 wherein decoding means produces a signal which generally conforms to the expression $z = t_i - I(t_i - 0.5)$ where $t_i$ is the duration of the preselected interval between zero crossings, expressed as a ratio to the predetermined bit period and wherein I represents an interger.

3. The radio receiver of claim 2 wherein the means for switching is arranged to switch the said part of the receiver into the active state when the average value of Z is in the range 0.8 to 1.1.

4. The radio receiver of claim 1 wherein the number of successive intervals is between 8 and 100.

5. The radio receiver of claim 4 wherein the number of successive intervals in 32.

6. The radio receiver of claim 4 wherein the number of successive intervals is 64.

7. The radio pager comprising in combination:
   receiving means for receiving a digitally coded radio signal in which the code format has a pattern that provides a plurality of zero crossing;
   decoding means for decoding a received signal fed from the receiving means and for producing a signal representative of the difference between the duration of a preselected interval between zero crossings expressed as a ratio to a predetermined bit period, and a predetermined integer value of the said ratio;
   means for integrating said signal over a plurality of successive intervals;
   means for switching at least part of the receiver between a quiescent and an active state in dependence upon the value of the integrated signal; and
   means responsive to an output of the decoding means for providing a paging signal.

* * * * *